UNITED STATES PATENT OFFICE.

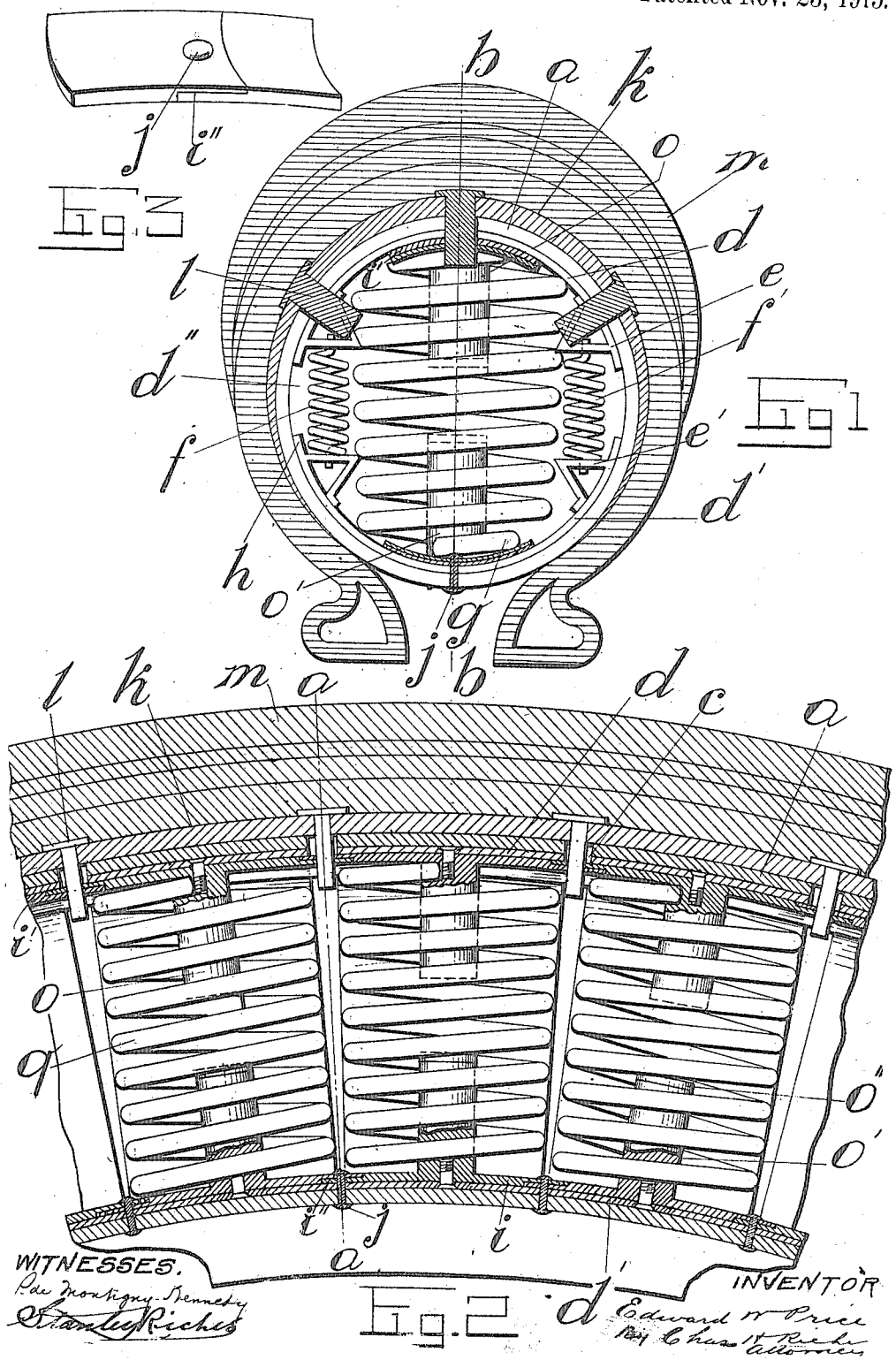

EDWARD WALTER PRICE, OF TORONTO, ONTARIO, CANADA.

RESILIENT TIRE.

1,161,247.

Specification of Letters Patent. Patented Nov. 23, 1915.

Application filed October 17, 1914. Serial No. 867,088.

*To all whom it may concern:*

Be it known that I, EDWARD WALTER PRICE, a citizen of the United States of America, and a resident of the city of Toronto, in the county of York and Province of Ontario, Dominion of Canada, have invented certain new and useful Improvements in Resilient Tires; and I hereby declare that the following is a full, clear, and exact description of the same.

This invention relates to a resilient tire comprising a plurality of independent tubular tire sections, arranged in an annular form, a pair of radially-alined spring plates within each tire section, and a compression spring pressing each pair of plates against the inner surface of the tire section, each of these plates being provided with a set of auxiliary springs to assist the compression spring in resisting the inward and assisting the outward flexion of the tire section.

In the drawings: Figure 1, is a vertical section taken on the line $a$—$a$, Fig. 2; Fig 2, is a vertical section taken on the line $b$—$b$, Fig. 1; and Fig. 3, is a fragmentary detail view of the interlocking ends of two adjacent joint covering plates, on a larger scale than the other views.

Like characters of reference refer to like parts throughout the specification and drawings.

The tire is composed of a set of tubular tire sections $a$, arranged in the form of an annulus, these tire sections being normally separated from each other so that they can freely expand and contract during their flexion under the influence of the load; spaces $c$, between them, being provided for that purpose. Contained within each tire section $a$, are two radially-alined spring plates $d$, $d'$, of a curvature corresponding to the inner surface of the tire section and in contact therewith. These plates, as shown in Fig. 1 of the drawings, are nearly semi-circular in shape, and their edges are separated from each other by a normally unoccupied space $d''$, so that the outer plate $d$ will have a limited inward movement during the inward flexion of the tire section.

Extending inwardly from each of the plates $d$, $d'$, are flanges $e$, $e'$, respectively; the flanges of the plate $d$ being separated from and substantially parallel with those of the plate $d'$. Interposed between the flanges $e$, $e'$, are two sets of auxiliary springs $f$, $f'$ which, by pressing against the flanges, cooperate with the compression spring $g$ in resisting the inward flexion and assisting the outward flexion of the tire section. Each of the plates $d$, $d'$ has a projecting part $h$, to overhang the adjacent portions of the auxiliary springs and limit the lateral or bending movement of these springs when the coils are compressed. The ends of the compression spring $g$ of each tire section bear against the plates $i$, $i'$, and the ends of the plate $i$, at the inner end of the compression spring, overlap the edges of the adjacent tire sections and interlock with the adjacent edges of the plates $i$ of the adjoining tire sections, as shown at $i''$ in Fig. 3, the interlocking edges being secured together by rivets $j$ to make a continuous band of plates $i$ around the inner circumference of the tire sections, and thus maintain them in their assembled relation, the plates $i'$ at the outer ends of the compression springs being so arranged that the tire sections can freely respond to the inward and outward flexions.

Partly inclosing the tire section $a$ is a covering $k$ of leather, or like material, and inserted through the covering $k$ are spacing and guiding pins $l$ which extend through the spaces $c$ between the tire sections to maintain the spaced relation of the compression springs and to assist in guiding and preventing the lateral movement of the coils of these springs during their compression and expansion. Partly surrounding the tire sections and their covering $k$ is a rubber shoe $m$ which may be made after the manner of any of the usual rubber tires.

When the tire is subjected to a load, the tire sections in contact with the roadway yield inwardly and compress the springs $g$ and auxiliary springs $f$, $f'$ to the limit of the load imposed on them or to the limit permitted by the guide posts $o$, $o'$, secured to or integral with the plates $i$, $i'$, and extending inwardly from the plates $d$, $d'$, respectively; these guide posts $o$, $o'$ being normally separated so that the tire sections can yield inwardly under the influence of the load until the inner ends of the guide posts come into engagement. To render the contact of these posts noiseless, their inner ends may be provided with rubber or fiber tappets $o''$, and to permit of the ends of these parts coming into contact during the inward flexions of the tire sections, the edges of the spring plates are normally separated from each other to the same extent as the inner ends of the posts. When each tire section is relieved of the weight of the load during the revolution of the wheel, its compression and auxiliary springs, press the tire section outward to its normal shape.

What I claim is:

1. A resilient tire comprising a plurality of independent tubular tire sections, a pair of radially-alined curved plates within each section, a compression spring pressing each pair of plates against the inner surface of the tire section, flanges extending inwardly from the curved plate on each side of the compression spring, and auxiliary springs engaging said flanges on opposite sides of the compression spring.

2. A tire comprising a plurality of independent tubular tire sections normally separated from each other for expansion and contraction during their flexion, a pair of radially-alined curved plates within each section and normally separated from each other so that the outer plate will have a limited inward movement during the inward flexion of the tire section, a compression spring pressing each pair of plates against the inner surface of the tire section, plates at the inner ends of the compression springs overlapping the edges of the adjacent tire sections and interlocking with one another, flanges extending inwardly from the inner surfaces of the curved plates on opposite sides of the compression spring, auxiliary springs engaging said flanges on opposite sides of the compression spring to assist its action, and a tubular cover inclosing the tire sections.

3. A resilient tire comprising a plurality of independent tubular tire sections, a pair of radially-alined curved plates within each section, a compression spring pressing each pair of plates against the inner surface of the tire section, flanges extending inwardly from the curved plate on each side of the compression spring, auxiliary springs engaging said flanges on opposite sides of the compression spring, and posts extending inwardly from the radially-alined plates into the ends of the compression spring.

4. A tire comprising a plurality of independent tubular tire sections normally separated from each other for expansion and contraction during their flexion, a pair of radially-alined curved plates within each section and normally separated from each other so that the outer plate will have a limited inward movement during the inward flexion of the tire section, plates at the inner ends of the compression springs overlapping the edges of the adjacent tire sections and interlocking with one another, flanges extending inwardly from the inner surfaces of the curved plates on opposite sides of the compression spring, auxiliary springs engaging said flanges on opposite sides of the compression spring to assist its action, a tubular cover inclosing the tire sections, and posts extending inwardly from the radially-alined plates into the ends of the compression spring.

Toronto, October 14th, 1914.

EDWARD WALTER PRICE.

Witnesses:
C. H. RICHES,
P. DE MONTIGNY-KENNEDY.